United States Patent
Bae et al.

(10) Patent No.: US 12,068,096 B2
(45) Date of Patent: Aug. 20, 2024

(54) INDUCTOR AND DC CONVERTER INCLUDING SAME

(71) Applicant: LG INNOTEK CO., LTD., Seoul (KR)

(72) Inventors: Seok Bae, Seoul (KR); Jai Hoon Yeom, Seoul (KR); Jung Hwan Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 255 days.

(21) Appl. No.: 17/624,032

(22) PCT Filed: Jul. 2, 2020

(86) PCT No.: PCT/KR2020/008640
§ 371 (c)(1),
(2) Date: Dec. 30, 2021

(87) PCT Pub. No.: WO2021/006539
PCT Pub. Date: Jan. 14, 2021

(65) Prior Publication Data
US 2022/0392685 A1 Dec. 8, 2022

(30) Foreign Application Priority Data

Jul. 9, 2019 (KR) .................. 10-2019-0082501

(51) Int. Cl.
*H01F 27/28* (2006.01)
*H01F 27/24* (2006.01)
*H02M 3/158* (2006.01)

(52) U.S. Cl.
CPC ............. *H01F 27/24* (2013.01); *H01F 27/28* (2013.01); *H02M 3/1586* (2021.05)

(58) Field of Classification Search
CPC ....... H01F 27/24; H01F 27/28; H02M 3/1586
See application file for complete search history.

(56) References Cited

U.S. PATENT DOCUMENTS 11,469,019 B2 * 10/2022 Li ..................... H01F 27/306
2012/0169443 A1    7/2012 Takiguchi et al.
(Continued)

FOREIGN PATENT DOCUMENTS

CN    114783742 A  *  7/2022  ............ H01F 27/24
CN    115410805 A  *  11/2022
(Continued)

OTHER PUBLICATIONS

Nakamura et al., "Three-Dimensional Reluctance Network Analysis Considering an Iron Loss Characteristic for an EIE-Core Variable Inductor", IEEE Transactions on Magnetics, Oct. 2005, vol. 41, No. 10, pp. 4033-4035.
(Continued)

*Primary Examiner* — Sisay G Tiku
(74) *Attorney, Agent, or Firm* — Birch, Stewart, Kolasch & Birch, LLP

(57) ABSTRACT

An inductor according to an embodiment of the present invention may include: a plurality of first E-type cores, each of which has a base unit and a center leg extending in a first direction from the base unit; a first I-type core arranged in the first direction from the plurality of first E-type cores; and a coil wound around the center leg of each of the plurality of first E-type cores. Here, the plurality of E-type cores may be arranged in a line along the first direction.

16 Claims, 11 Drawing Sheets

(56) References Cited

U.S. PATENT DOCUMENTS

| | | | |
|---|---|---|---|
| 2017/0194086 A1 | | 7/2017 | Zhou et al. |
| 2018/0174739 A1 | * | 6/2018 | Nakajima ........... H01F 27/2876 |
| 2019/0006936 A1 | | 1/2019 | Wolf et al. |

FOREIGN PATENT DOCUMENTS

| | | | | | |
|---|---|---|---|---|---|
| CN | 218414205 U | * | 1/2023 | | |
| CN | 116110689 A | * | 5/2023 | | |
| CN | 116598101 A | * | 8/2023 | | |
| JP | H1197255 A | * | 4/1999 | | |
| JP | 2010-161868 A | | 7/2010 | | |
| JP | 2012059942 A | * | 3/2012 | ........... | H01F 27/255 |
| JP | 2012-146786 A | | 8/2012 | | |
| JP | 2017-112349 A | | 6/2017 | | |
| KR | 10-2019-0030765 A | | 3/2019 | | |
| WO | WO-2011030531 A1 | * | 3/2011 | ............. | H01F 27/22 |

OTHER PUBLICATIONS

Xu et al., "High Power Density Three-Phase Shunt Active Power Filter Design Based on Multiple Magnetic Integrations of LCL Filter", Journal of Circuits, Systems, and Computers, 2017, vol. 26, No. 12, pp. 1750194-1 to 1750194-22.

Yang et al., "Design of "EIE" Shape Coupling Inductors and Its Application in Interleaved LLC Resonant Converter", IEEE, 2018, total 5 pages.

Noh et al., "AC-DC Converter Using the PFC Inductor and LLC Resonant Transformer with an Integrated Magnetic Core", Jeonju University, Nov. 23, 2012, pp. 35-36.

\* cited by examiner

[FIG. 1]
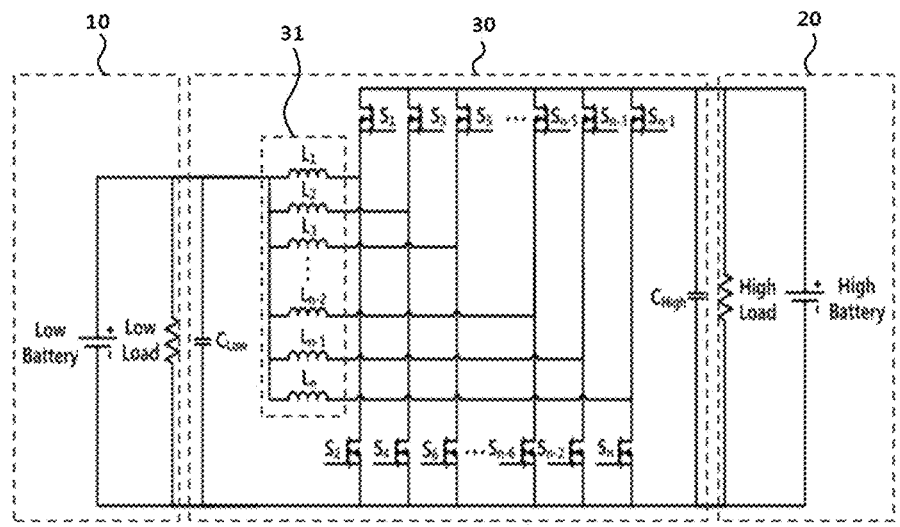

[FIG. 2]
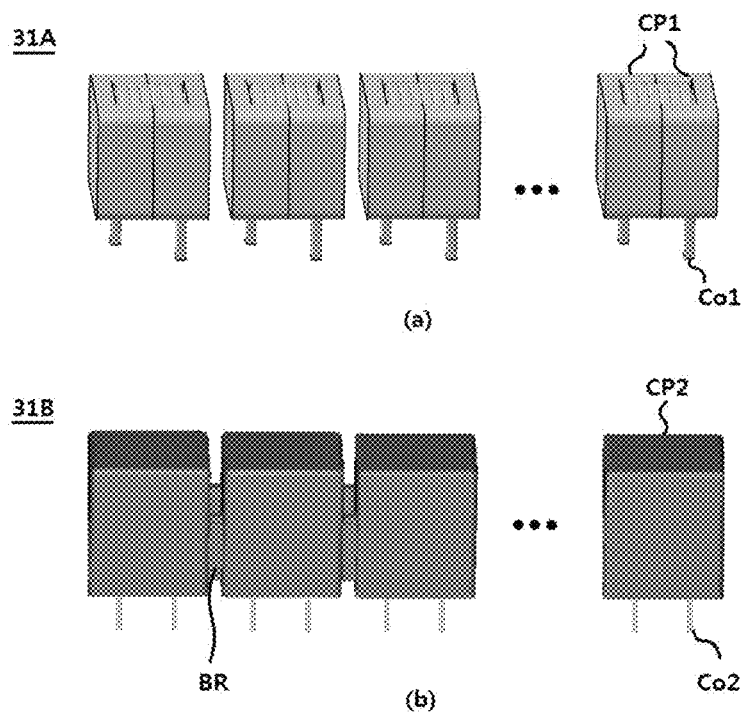

[FIG. 3a]
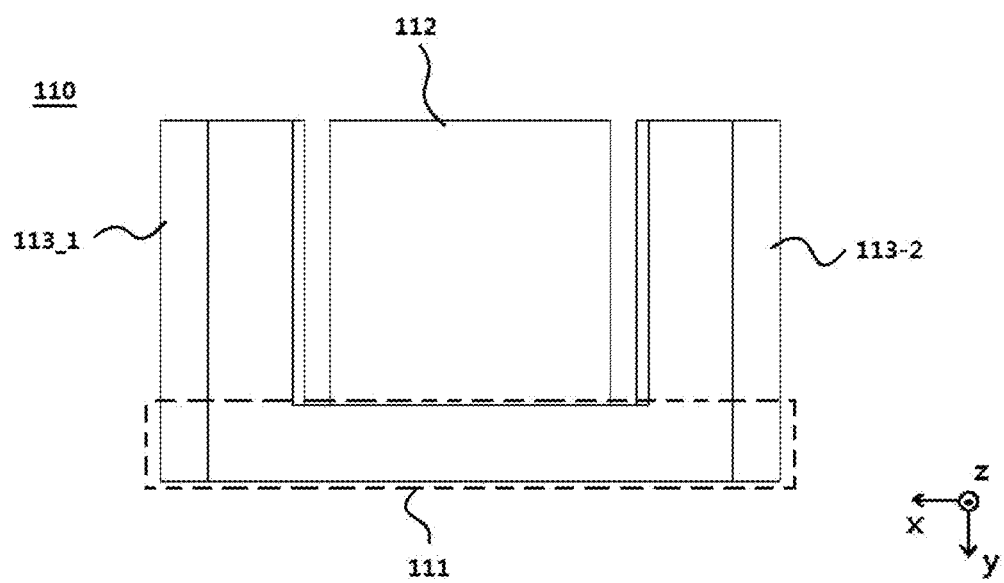

[FIG. 3b]
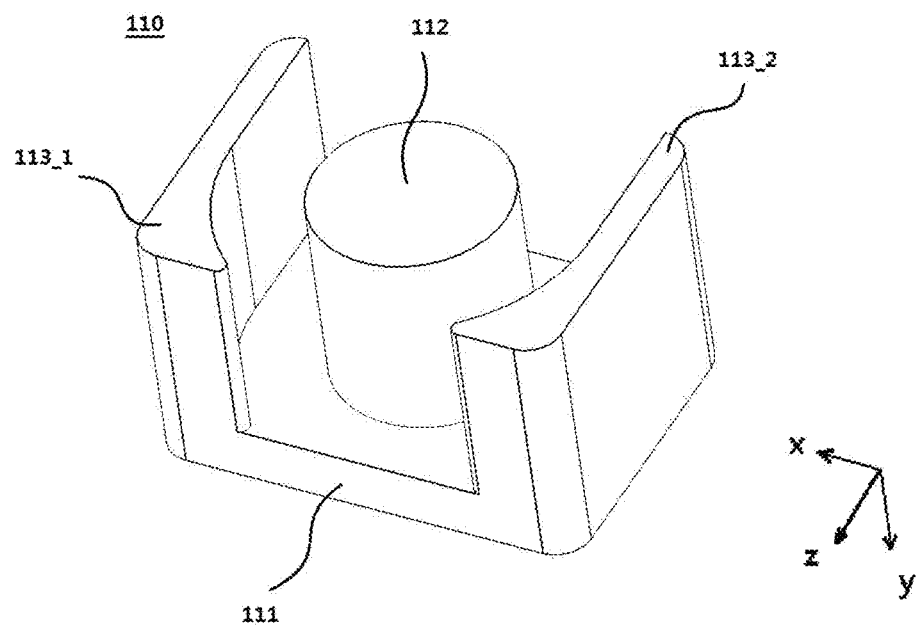

[FIG. 3c]
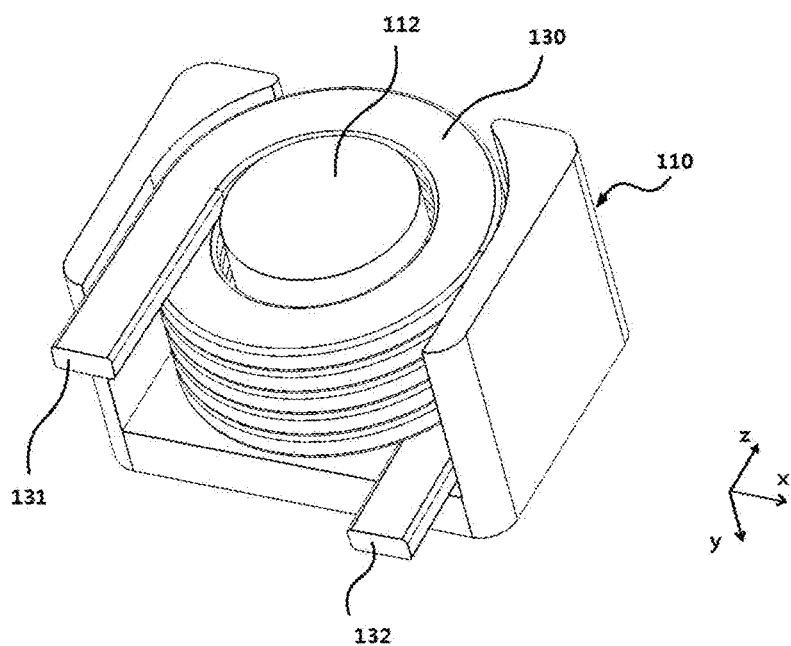

[FIG. 4a]
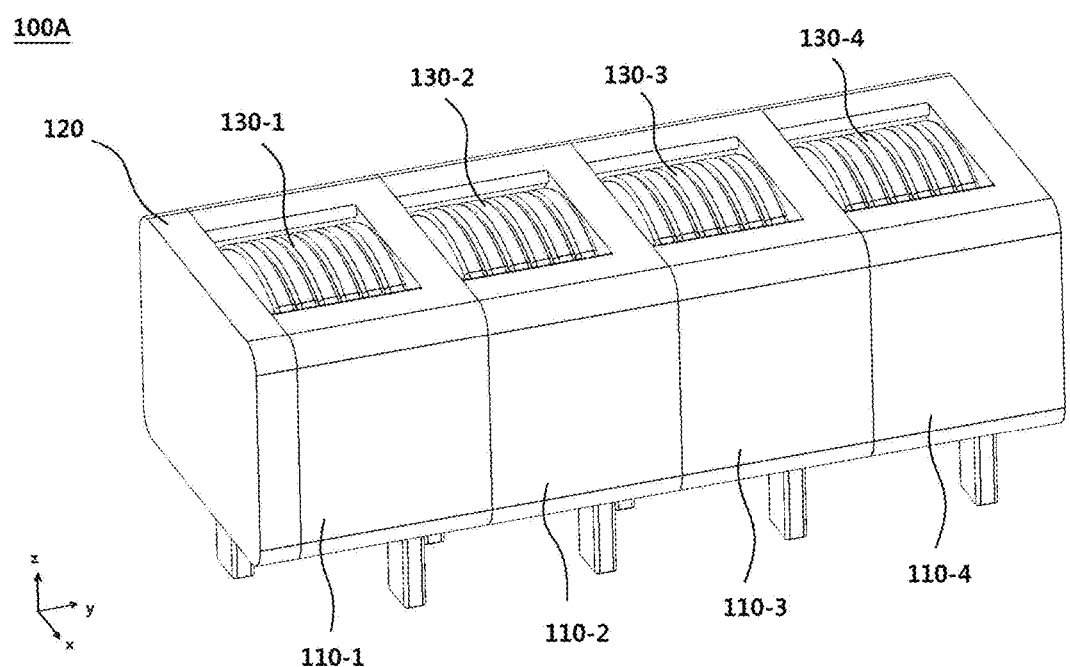

[FIG. 4b]
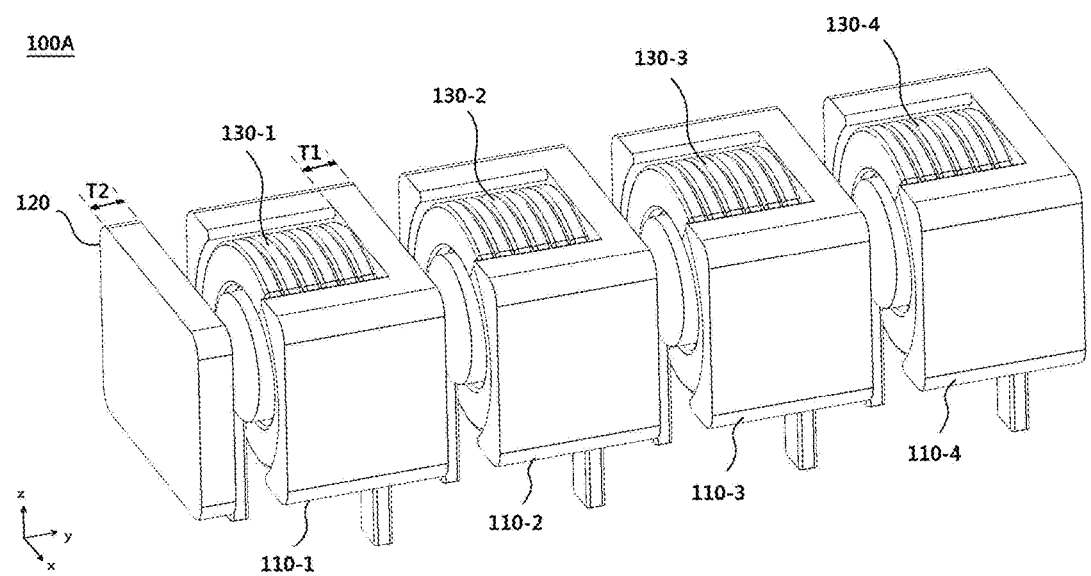

[FIG. 5]
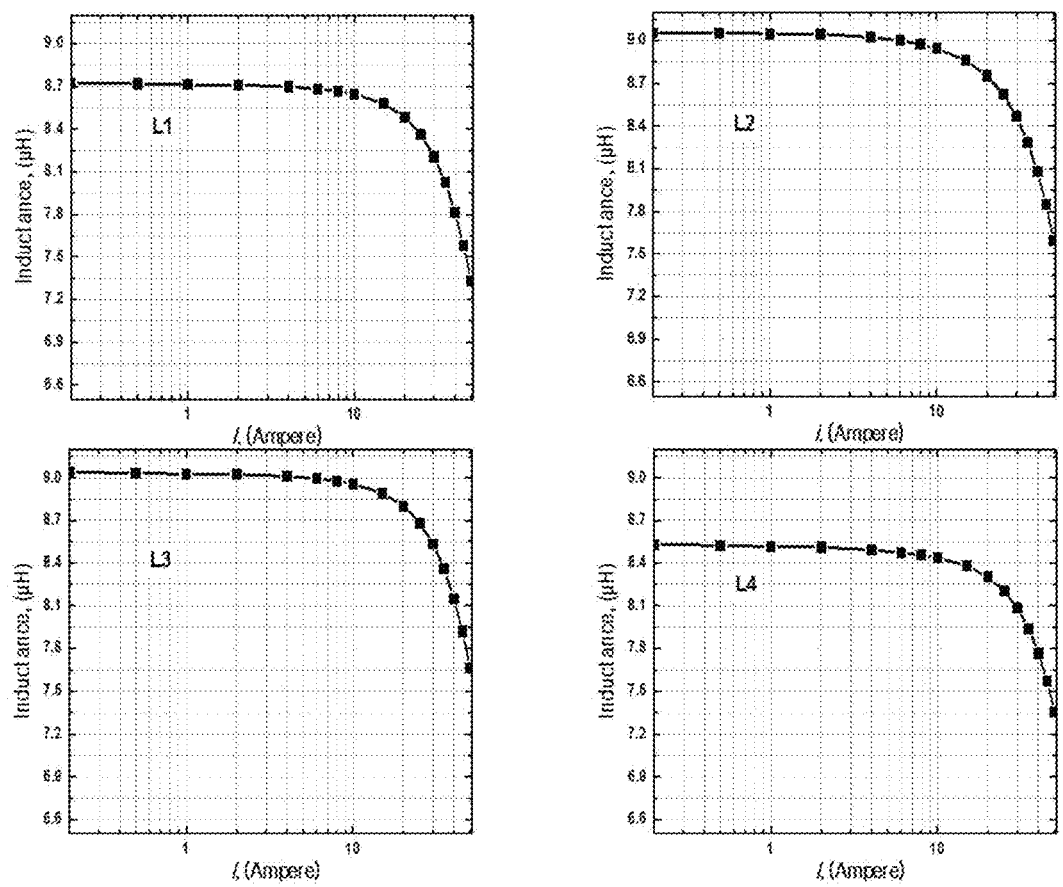

[FIG. 6]
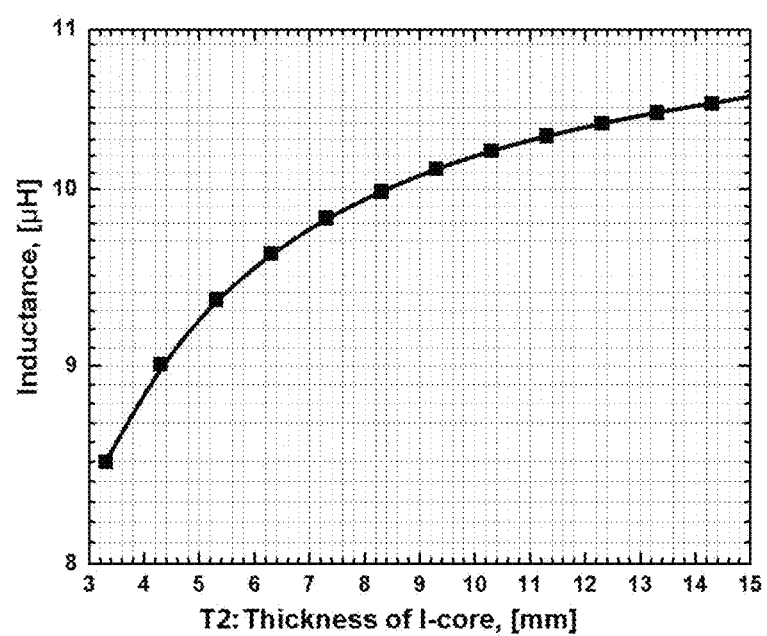

[FIG. 7]
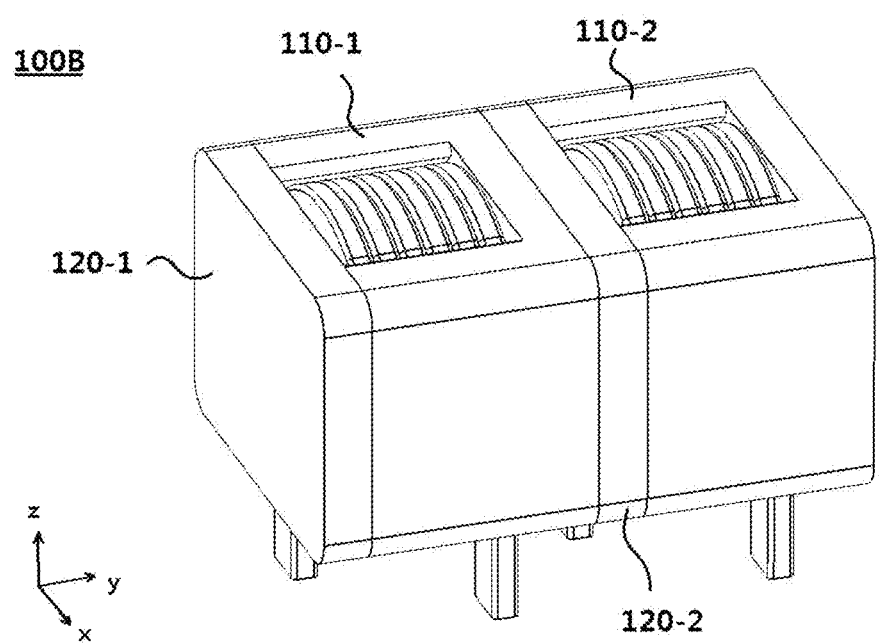

[FIG. 8]
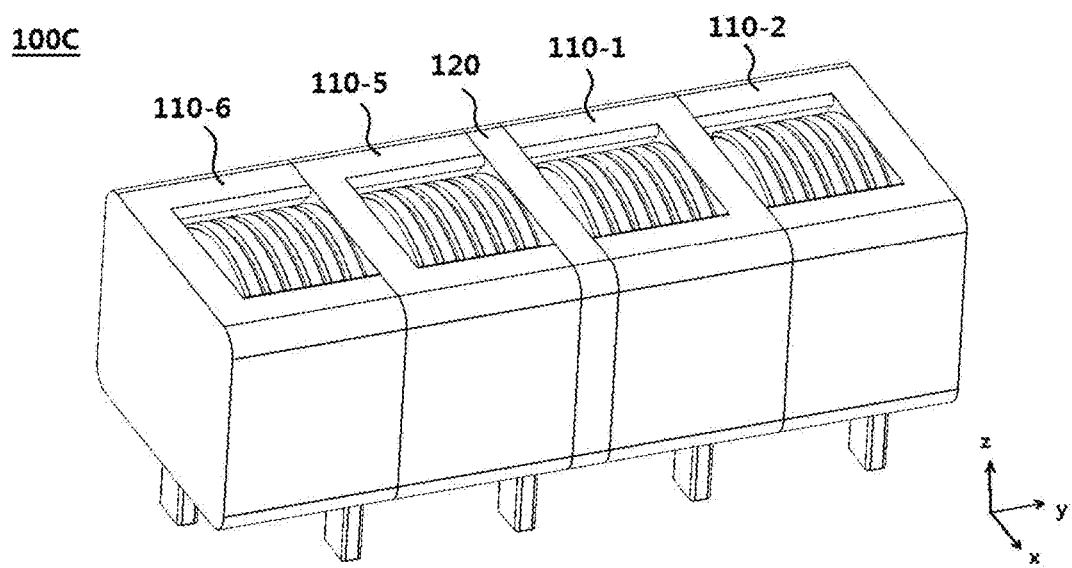

INDUCTOR AND DC CONVERTER INCLUDING SAME

CROSS REFERENCE TO RELATED APPLICATIONS

This application is the National Phase of PCT International Application No. PCT/KR2020/008640, filed on Jul. 2, 2020, which claims priority under 35 U.S.C. 119(a) to Patent Application No. 10-2019-0082501, filed in the Republic of Korea on Jul. 9, 2019, all of which are hereby expressly incorporated by reference into the present application.

TECHNICAL FIELD

Embodiments relate to an inductor and a direct current converter including the same.

BACKGROUND ART

Due to continuous interest in the environment and regulations pertaining thereto, studies on an eco-friendly vehicle equipped with an electric motor are being actively conducted. Generally, an eco-friendly vehicle uses a high-voltage power electric (PE) system of 300V or higher, but recently, a 48V-based mild hybrid system has also been studied.

A mild hybrid vehicle applies 48V as a system voltage, which allows energy capacity and output to be easily increased compared to an existing case where 12V is applied as a system voltage. Accordingly, even if the same power is supplied to various electric loads, current may be reduced in amount, and thus wires may be reduced in thickness. Therefore, the overall weight of the system is reduced, and thus improved fuel efficiency and system efficiency may be expected. However, since it is costly to replace all electric devices with those of a 48V system, a 48V-12V dual system that utilizes both the existing 12V system and the 48V system may be considered. The configuration of such a dual system will be described with reference to FIG. 1.

FIG. 1 illustrates an example of the structure of a general dual system.

Referring to FIG. 1, the dual system may include a low-voltage unit 10 including a 12V battery (a low battery) and a 12V electric device (a low load), a high-voltage unit 20 including a 48V battery (a high battery) and a 48V electric device (a high load), and a bidirectional direct current (DC-DC) converter 30.

The bidirectional DC-DC converter 30 may convert power of the 12V battery (low battery) into 48V power and supply the converted power to the high-voltage unit 20, or conversely, may convert power of the 48V battery (high battery) into 12V power and supply the converted power to the low-voltage unit 10.

Most such dual systems use an interleaved multi-phase converter because such a converter satisfies various characteristics required for hybrid vehicles, including efficiency improvement. In particular, since ripples in input and output currents are reduced in the multi-phase converter, input and output capacitors and an inductor may be reduced in size, thereby reducing the weight and size of the entire system as well as improving the lifespan and reliability of passive elements.

Specifically, the multi-phase converter is composed of N phases, and includes an inductor unit 31, including N inductors $L_1$ to $L_n$, and N switching elements. With this configuration, the N switching elements are controlled to allow current to flow through only one inductor at a time. Here, since the switching elements are switched with phase differences of "360 degrees/N" at the respective phases, input and output filters may be reduced in capacity and volume due to a ripple offset between the currents, and thus the system may be reduced in size.

The configuration of each of inductors constituting such a multi-phase converter will be described with reference to FIG. 2.

FIG. 2 illustrates an example of an inductor structure applied to a general multi-phase converter.

First, referring to FIG. 2(*a*), each of inductors constituting an inductor unit 31A includes a core unit CP1, including two symmetrical E-type cores, and a coil Co1 wound inside the core unit CP1.

Alternatively, as illustrated in FIG. 2(*b*), each of inductors constituting an inductor unit 31B may include a coil Co2, and a core unit CP2 injection-molded thereon with resin that contains soft magnetic powder. The inductors may be connected as many as the number of phases through a bridge BR.

However, because the inductor illustrated in FIG. 2(*a*) needs twice as many cores as the number of phases, the inductor is increased in size. Moreover, in the inductor illustrated in FIG. 2(*b*), the density of magnetic powder in the injection-molded core unit is non-uniform or decreased depending on the injection environment. This increases the effective cross-sectional area compared to a ferrite core under the same conditions, thereby increasing the size of each of the inductors.

DISCLOSURE

Technical Problem

Embodiments provide a much slimmer inductor and a multi-phase converter including the same.

The technical problems to be solved by the present invention are not limited to the technical problems described above, and other technical problems not described herein may be clearly understood by those having ordinary knowledge in the art from the description of the examples.

Technical Solution

In one embodiment, an inductor includes a plurality of first E-type cores, each of which has a base and a center leg extending in a first direction from the base, a coil wound around the center leg of each of the plurality of first E-type cores, and a first I-type core arranged to face a center leg of any one of the plurality of first E-type cores. Here, the plurality of E-type cores may be arranged in a line in the first direction.

The base of at least one of the plurality of first E-type cores may be connected to the center leg, and may have a side shape corresponding to the I-type core.

A first thickness of the base of at least one of the plurality of first E-type cores may be smaller than a second thickness of the I-type core in the first direction.

The second thickness may be equal to or greater than 120% of the first thickness.

Each of the plurality of first E-type cores may be an EPC-type core.

The first E-type cores may be in contact with each other.

The first I-type core may be disposed at a distal end in the first direction.

The inductor may further include a second I-type core disposed between first E-type cores that are adjacent to each other, among the plurality of first E-type cores.

The inductor may further include at least one second E-type core arranged symmetrically with the plurality of first E-type cores about the I-type core.

In one embodiment, a multi-phase converter includes a plurality of switching elements, and at least one inductor, wherein each of the at least one inductor may include a plurality of first E-type cores, each of which has a base and a center leg extending in a first direction from the base, a coil wound around the center leg of each of the plurality of first E-type cores, and a first I-type core arranged to face a center leg of any one of the plurality of first E-type cores. Here, the plurality of first E-type cores and the first I-type core may be arranged in a line in the first direction.

Each of the coils may correspond to one phase, and the plurality of switching elements may be controlled to allow current to flow through only one coil at a time.

The first I-type core may be disposed at a distal end in the first direction.

Advantageous Effects

Embodiments provide an inductor and a multi-phase converter including the same capable of reducing the volume occupied by cores and slimming down the entire system by sharing a magnetic path with adjacent cores in an environment in which current is applied to one coil at a time.

The effects obtained by the present invention are not limited to the effects mentioned above, and other effects not mentioned above will be clearly understood by those skilled in the art based on the following description.

DESCRIPTION OF DRAWINGS

FIG. 1 illustrates an example of a general dual system structure.

FIG. 2 illustrates an example of an inductor structure applied to a general multi-phase converter.

FIG. 3A is a side view of a core according to one embodiment, and FIG. 3B is a perspective view of the core according to one embodiment.

FIG. 3C is a perspective view illustrating an example in which a coil is wound inside the core illustrated in FIGS. 3A and 3B.

FIG. 4A is a perspective view of an inductor according to one embodiment, and FIG. 4B is an exploded perspective view of the inductor according to one embodiment.

FIG. 5 shows inductance for each part of the inductor according to one embodiment.

FIG. 6 shows changes in inductance depending on a thickness of an I-type core according to one embodiment.

FIG. 7 is a perspective view of an inductor according to a different embodiment.

FIG. 8 is a perspective view of an inductor according to a further embodiment.

BEST MODE

Since the present invention may be variously changed and may have various embodiments, exemplary embodiments will be illustrated and described in the drawings. However, this is not intended to limit the present invention to the exemplary embodiments, it should be understood to include all modifications, equivalents and substitutes included in the idea and scope of the present invention.

It will be understood that although the terms first, second, etc. may be used herein to describe various elements, these elements should not be limited by these terms. These terms are generally only used to distinguish one element from another. For example, without departing from the scope of the present invention, a first component may be referred to as a second component, and similarly, a second component may also be referred to as a first component. The term "and/or" includes a combination of any or all of the plurality of related listed items.

It should be understood that, when an element is referred to as being "connected with" another element, there may be intervening elements present, or the element may be directly connected with the another element. In contrast, it should be understood that, when an element is referred to as being "directly connected with" another element, there are no intervening element present.

In the following description of the embodiments, it will be understood that, when an element such as a layer (film), region, pattern, or structure is referred to as being "on" or "under" another element, it can be "directly" on or under the other element, or can be "indirectly" disposed such that an intervening element is also present. In addition, it will also be understood that the criteria for "on" or "under" are determined on the basis of the drawings. In addition, since the thickness or size of each layer (film), region, pattern, or structure in the drawings may be changed for clarity and convenience of description, the dimensions of constituent elements may not accurately reflect the actual dimensions.

The terminology used herein is for the purpose of describing particular embodiments only, and is not intended to be limiting. A singular representation may include a plural representation unless the context clearly indicates otherwise. As used herein, the singular forms "a", "an", and "the" are intended to include the plural forms as well, unless the context clearly indicates otherwise. It will be further understood that the terms "comprise", "have", etc., when used in this specification, specify the presence of stated features, integers, steps, operations, elements, components, or combinations thereof, but do not preclude the presence or addition of one or more other features, integers, steps, operations, elements, components, or combinations thereof.

Unless otherwise defined, all terms including technical and scientific terms used herein have the same meanings as those commonly understood by one of ordinary skill in the art to which this invention belongs. It will be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

A detailed description of exemplary embodiments will now be given with reference to the accompanying drawings. For the sake of brevity of description with reference to the drawings, the same or equivalent components may be denoted by the same reference numbers, and a description thereof will not be repeated.

Before describing embodiments of the present invention, a core that may be adopted in the embodiments will be described first. In the embodiments, two types of cores, an I-type core and an E-type core, are adopted. The configuration of the E-type core will be described with reference to FIGS. 3A to 3C.

FIG. 3A is a side view of a core according to one embodiment, and FIG. 3B is a perspective view of the core according to one embodiment.

Referring to FIGS. 3A and 3B together, an E-type core 110 according to the embodiment may include a base 111, a center leg 112, and two outer legs 113_1 and 113_2.

The base 111 may have a rectangular planar shape having a long side extending in one axial direction (e.g., the x-axis direction) and a short side extending in the other axial direction (e.g., the z-axis direction) intersecting the one axial direction. Here, the corners thereof may be rounded, depending on the embodiment. This planar shape is exemplary, and in other embodiments the base 111 may also have other shapes, such as an hourglass shape.

Each of the center leg 112 and the two outer legs 113_1 and 113_2 may extend from a plane of the base 111 in a direction crossing the plane (e.g., −y-axis). The center leg 112 may have a cylindrical shape, but may also have a track-type planar shape in some embodiments. In addition, the outer legs 113_1 and 113_2 are disposed on opposite sides facing each other at a periphery of the center leg 112. A core having such a shape is also referred to as an EPC-type core. Although the description has been focused on the EPC-type core in FIGS. 3A to 3C, it goes without saying that other types of E-type cores may also be adopted in the embodiments. For example, in FIGS. 4A to 8, an EQ-type core is adopted instead of an EPC-type core. The EQ-type core is substantially the same as the EPC-type core, except that the distance between inner side surfaces of the outer legs and the outer circumferential surface of the center leg is consistent in a circumferential direction in the EQ-type core.

Meanwhile, the E-type core 110 may contain Mn—Zn-based ferrite, and the magnetic permeability ($\mu$) of the ferrite may be from 2,000 to 15,000, but is not necessarily limited thereto.

FIG. 3C is a perspective view illustrating an example in which a coil is wound inside the core illustrated in FIGS. 3A and 3B.

Referring to FIG. 3C, a receiving hollow, defined in a cut-out track-type planar shape between the inner side surfaces of the two outer legs 113_1 and 113_2 and the outer circumferential surface of the center leg 112 in the E-type core 110, may be provided with a coil 130 wound around the center leg 112. The coil 130 may be formed of a conductive wire having a rectangular wire shape with a polygonal cross-section, and opposite ends 131 and 132 of the conductive wire may be drawn out of the core 110 through one side of the core 110, the one side having a larger gap between the inner surfaces of the two outer legs 113_1 and 113_2. For example, the coil 130 may contain a conductive metal such as copper or aluminum, one metal wire may form one coil, and the opposite ends 131 and 132 of the conductive wire may correspond to terminals for fixation and conduction of electricity to another component such as a substrate of a device including an inductor 100A, 100B, or 100C (e.g., a multi-phase converter).

Hereinafter, the configuration of an inductor according to one embodiment will be described with reference to FIGS. 4A and 4B, based on the E-type core 110 and the coil 130 described above.

FIG. 4A is a perspective view of an inductor according to one embodiment, and FIG. 4B is an exploded perspective view of the inductor according to one embodiment.

Referring to FIGS. 4A and 4B together, the inductor 100A according to one embodiment may include a plurality of (here, four) E-type cores 110-1, 110-2, 110-3, and 110-4, one I-type core, and coils 130-1, 130-2, 130-3, and 130-4, each of which is wound around a center leg of a corresponding one of the E-type cores.

Here, the four E-type cores 110-1, 110-2, 110-3, and 110-4 may be arranged in a line in a direction in which a center leg extends from a corresponding one of the bases (i.e., the −y-axis direction). In addition, an I-type core 120 may be disposed in a direction in which a center leg extends from a corresponding one of the four E-type cores 110-1, 110-2, 110-3, and 110-4 (i.e., the −y-axis direction). In other words, the I-type core may be disposed to face a center leg of any one of the E-type cores (here, the core 110-1), and may be disposed at a distal end in the direction in which each of the center legs extends.

Here, each of the cores 110-1, 110-2, 110-3, and 110-4 may be in contact with a center leg and outer legs of another core adjacent thereto, or may be in contact with at least some of a center leg and outer legs of another core adjacent thereto while forming a gap therebetween of a predetermined distance (e.g., 100 μm) so as to control the effective permeability.

Due to this arrangement, each of the coils 130-1, 130-2, 130-3, and 130-4 uses an E-type core, in which a corresponding coil itself is wound, and at least one core adjacent to the E-type core, in which the corresponding coil itself is wound, as a magnetic flux path. For example, the coil 130-1 adjacent to the I-type core 120 uses the I-type core 120 and the E-type core 110-1, in which the coil 130-1 itself is wound, as a main or dominant magnetic flux path. Of course, the remaining E-type cores 130-2, 130-3, and 130-4 may also function as a magnetic flux path when current is applied to the coil 130-1, although the remaining E-type cores 130-2, 130-3, and 130-4 do not function as much as the main magnetic flux path. Accordingly, when the inductor 100A according to one embodiment illustrated in FIGS. 4A and 4B is employed in a multi-phase converter, the inductor 100A may substantially perform the function of four separate inductors (e.g., $L_1$-$L_4$ in FIG. 1).

Of course, when current is applied to each of the coils 130-1, 130-2, 130-3, and 130-4 at the same time in this configuration, current of each coil may affect that of adjacent coils, thus causing the inductor to be rapidly saturated. However, when the inductor 100A, 100B, or 100C according to an embodiment is employed in a multi-phase converter, which is an N-phase converter composed of preferably three or more phases, switching elements are switched with phase delays of $2\pi/N$ at the respective phases, and therefore, currents of adjacent phases do not affect each other. Therefore, there is no disadvantage of sharing cores adjacent to each other, and thus the volume occupied by the cores in the inductor is reduced, which is advantageous for slimming.

These effects will be described in comparison with comparative embodiments with reference to Table 1 below.

TABLE 1

| Performance | | Embodiment | Comparative Embodiment 1 | Comparative Embodiment 2 |
|---|---|---|---|---|
| 1. Inductance (μH, based on 6Ts) (Magnetic Permeability) | $L_0$ (@100 kHz, 20 mA) | 6.0 (60) | 7 (20-30) | 6.3 (−60) |
| | $L_{DC}$ (@100 kHz, 50 A) | 5.1 (85.0%) | 5.6 (80.0%) | 5.4 (85.0%) |
| | $L_{DC}$ (@100 kHz, 80 A) | 4.3 (71.7%) | 4.6 (65.7%) | 4.5 (71.7%) |
| 2. Core Loss (mW/cc) | @ 100 kHz, 50 mT | 300-350 | 400-450 | 350-400 |

TABLE 1-continued

| Performance | | Embodiment | Comparative Embodiment 1 | Comparative Embodiment 2 |
|---|---|---|---|---|
| 3. Inductor Size (mm) | Length | 65.3 | 82.3 | 75.6 |
| | Width | 26.5 | 26 | 26.5 |
| | Height (without coil) | 21 | 26.5 | 21 |
| | Volume (cc) | 36.3 | 56.7 | 42.1 |

In Table 1, Comparative Embodiment 1 corresponds to the inductor illustrated in FIG. 2(a), and Comparative Embodiment 2 corresponds to the inductor illustrated in FIG. 2(b).

Referring to Table 1, it is shown that the inductor 100A according to the embodiment has similar or superior magnetic permeability, has a smaller core loss, and has a significantly lower volume due to sharing of a magnetic path with adjacent cores, compared to the comparative embodiments.

Meanwhile, the I-type core 120 may have a shape corresponding to the base of each of the E-type cores 110-1, 110-2, 110-3, and 110-4. However, in each of the E-type cores 110-1, 110-2, 110-3, and 110-4, the thickness T1 of the base in a direction in which the center leg extends (i.e., −y-axis direction) may be the same as or different from the thickness T2 of the I-shaped core 120 in the same direction (i.e., the −y-axis direction).

The inductance that is generated when current is applied to a corresponding one of the coils 130-1, 130-2, 130-3, and 130-4 in the case in which the thickness T1 and the thickness T2 are the same is as shown in FIG. 5.

FIG. 5 shows the inductance for each part of the inductor according to one embodiment.

In FIG. 5, four graphs are shown. In each graph, the horizontal axis denotes current and the vertical axis denotes inductance. In addition, L1 in the graph at the upper left side denotes the inductance of current when current is applied to the fourth coil 130-4, L2 in the graph at the upper right side denotes the inductance of current when current is applied to the third coil 130-3, L3 in the graph at the lower left side denotes the inductance of current when current is applied to the second coil 130-2, and L4 in the graph at the lower right side denotes the inductance of current when current is applied to the first coil 130-1.

Referring to FIG. 5, L1, L2, and L3 show a maximum inductance of 8.7 pH to 9 pH, but L4 shows a relatively low maximum inductance of about 8.5 pH. This difference is due to the difference in the configuration of the main magnetic flux path. That is, each of the second to fourth coils 130-2, 130-3, and 130-4 uses two E-type cores, the two E-type cores having a relatively large volume, as a main magnetic flux path, but the first coil 130-1 (corresponding to L4) uses the I-type core 120, having a relatively small volume, as a main magnetic flux path, and thus the inductance may be reduced compared to the other cases (L1, L2, and L3).

In order to compensate for the above-described difference in inductance for each part, a method of making the thickness T2 of the I-type core 120 greater than the thickness T1 of the base of the E-type core may be considered. The effect thereof will be described with reference to FIG. 6.

FIG. 6 shows changes in inductance depending on the thickness of the I-type core according to one embodiment.

FIG. 6 is a graph showing the magnitude of inductance L4, which is tested while increasing T2 in the state in which T1 is fixed at 3.3 mm.

Referring to FIG. 6, from the point at which the thickness T2 of the I-type core 120 is 4 mm, which is equal to or greater than 20% of the thickness T1 of the base of the E-type core, performance similar to the maximum inductance in L1 to L3 shown in FIG. 5 is observed. Therefore, the thickness T2 of the I-type core 120 according to the embodiment may be from 4 mm to 5 mm, that is, from 120% to 150% of the thickness T1 of the base of the E-type core. This is because inductance varies for each part of the coil when the thickness T2 of the I-type core 120 is less than 120% of the thickness T1 of the base of the E-type core, and the total volume of the inductor becomes larger than necessary when the thickness T2 of the I-type core 120 is 150% or more of the thickness T1 of the base of the E-type core.

Meanwhile, the arrangement of the E-type cores and the I-type core described above may be variously modified. For example, the inductor 100A according to one embodiment corresponds to four phases, but may correspond to three phases when excluding the E-type core 110-4 and the coil 130-4 disposed at the distal end. In addition thereto, the relative arrangement between the E-type cores and the I-type core may also be changed. This will be described with reference to FIGS. 7 and 8.

FIG. 7 is a perspective view of an inductor according to a different embodiment.

Referring to FIG. 7, apart from the fact that the number of E-type cores arranged in a line in the inductor 100B according to the different embodiment is different from the number of E-type cores arranged in a line in the inductor 100A according to the one embodiment, in the inductor 100B according to the different embodiment, an I-type core 120-2 may be further disposed between the E-type core 110-1 and the E-type core 110-2 aligned in the same direction.

In this case, the magnetic path between coils, where inter-switching magnetic flux is relatively more concentrated, is reinforced, and thus inductance improvement and loss reduction may be expected.

FIG. 8 is a perspective view of an inductor according to a further embodiment.

Referring to FIG. 8, in the inductor 100C according to the further embodiment, in addition to the E-type cores 110-1 and 110-2 arranged in a line at one side of the I-type core 120 (in the Y-axis direction) in the inductor 100A according to the one embodiment, other E-type cores 110-5 and 110-6 may be further arranged in a line so as to be symmetrical with the corresponding cores 110-1 and 110-2 about the I-type core 120.

The description of each of the above-described embodiments may be applied to other embodiments, unless there is a conflict between the content thereof.

Although the foregoing description has been given with reference to the embodiments, these are merely illustrative and do not limit the present disclosure, and it will be understood that those skilled in the art will be able to variously modify and change the present disclosure without departing from the essential characteristics of the embodiments. For example, each component specifically shown in the embodiments can be modified. Moreover, differences related to such modifications and applications should be construed as being included in the scope of the present disclosure, which is defined in the appended claims.

The invention claimed is:

1. An inductor comprising:
a plurality of first E-type cores, each of which has a base and a center leg extending in a first direction from the base;

a coil wound around the center leg of each of the plurality of first E-type cores; and a first I-type core arranged to face a center leg of any one of the plurality of first E-type cores, wherein the plurality of first E-type cores and the first I-type core are arranged in a line in the first direction, wherein a first thickness of the base of at least one of the plurality of first E-type cores is smaller than a second thickness of the I-type core in the first direction, and wherein the second thickness is equal to or greater than 120% of the first thickness and less than 150% of the first thickness.

2. The inductor according to claim 1, wherein the base of at least one of the plurality of first E-type cores is connected to the center leg, and has a side shape corresponding to the I-type core.

3. The inductor according to claim 1, wherein the plurality of first E-type cores are in contact with each other.

4. The inductor according to claim 1, wherein the first I-type core is disposed at a distal end in the first direction.

5. The inductor according to claim 4, further comprising:
a second I-type core disposed between first E-type cores that are adjacent to each other, among the plurality of first E-type cores.

6. The inductor according to claim 1, further comprising:
at least one second E-type core arranged symmetrically with the plurality of first E-type cores with respect to the first I-type core.

7. The inductor according to claim 1, wherein the coil uses a core adjacent to the plurality of first E-type cores, in which the coil is wound, as a magnetic flux path.

8. The inductor according to claim 1, wherein each of the plurality of first E-type cores is an EPC-type core.

9. A multi-phase converter comprising:
a plurality of switching elements; and
at least one inductor,
wherein each of the at least one inductor comprises:
a plurality of first E-type cores, each of which has a base and a center leg extending in a first direction from the base;
a coil wound around the center leg of each of the plurality of first E-type cores; and
a first I-type core arranged to face a center leg of any one of the plurality of first E-type cores, wherein the plurality of first E-type cores and the first I-type core are arranged in a line in the first direction, wherein a first thickness of the base of at least one of the plurality of first E-type cores is smaller than a second thickness of the I-type core in the first direction, and wherein the second thickness is equal to or greater than 120% of the first thickness and less than 150% of the first thickness.

10. The multi-phase converter according to claim 9, wherein each of the coils corresponds to one phase, and
wherein the plurality of switching elements is controlled to allow current to flow through only one coil at a time.

11. The multi-phase converter according to claim 9, wherein the first I-type core is disposed at a distal end in the first direction.

12. The multi-phase converter according to claim 11, further comprising:
a second I-type core disposed between first E-type cores adjacent to each other among the plurality of first E-type cores.

13. The multi-phase converter according to claim 9, further comprising:
at least one second E-type core arranged symmetrically with the plurality of first E-type cores with respect to the first I-type core.

14. The multi-phase converter according to claim 9, wherein the base of at least one of the plurality of first E-type cores is connected to the center leg and has a side shape corresponding to the I-type core.

15. The multi-phase converter according to claim 9, wherein the center legs of the plurality of first E-type cores are disposed with a gap therebetween, which is a target separation distance.

16. The multi-phase converter according to claim 9, wherein the coil uses a core adjacent to the plurality of first E-type cores, in which the coil is wound, as a magnetic flux path.

* * * * *